Figure 1:
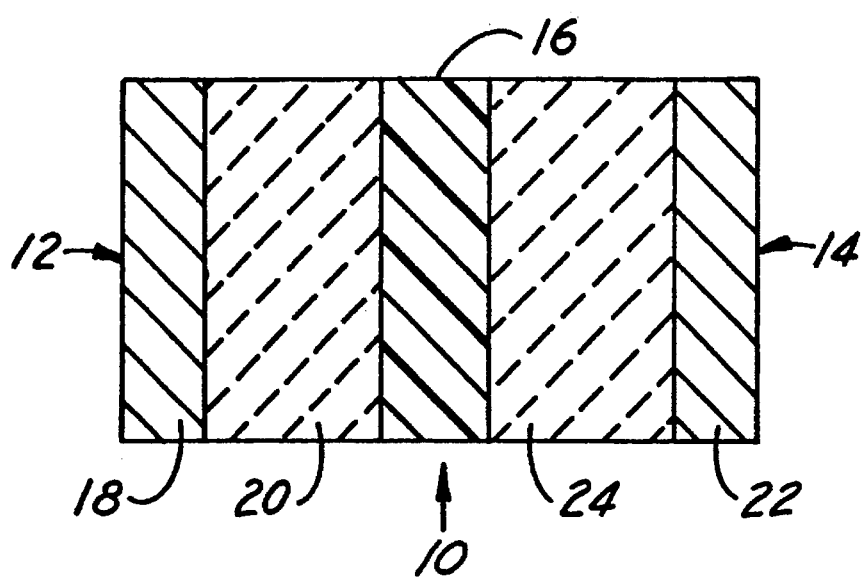

United States Patent
Koksbang

Patent Number: 5,512,214
Date of Patent: Apr. 30, 1996

[54] LITHIUM BATTERY ELECTRODE COMPOSITIONS

[76] Inventor: Rene Koksbang, 4231 Norwalk Dr., No. EE101, San Jose, Calif. 95129

[21] Appl. No.: 324,371

[22] Filed: Oct. 17, 1994

Related U.S. Application Data

[63] Continuation of Ser. No. 40,224, Mar. 30, 1993, abandoned.

[51] Int. Cl.⁶ ............... H01B 1/00; H01B 1/04; H01B 1/08; H01M 4/58
[52] U.S. Cl. ............ 252/506; 252/502; 252/518; 429/209; 429/212; 429/218; 429/232
[58] Field of Search .................. 252/502, 506, 252/518; 429/209, 212, 218, 232

[56] References Cited

U.S. PATENT DOCUMENTS

| | | | |
|---|---|---|---|
| 4,144,384 | 3/1979 | Jacobson et al. | 429/218 |
| 4,243,624 | 1/1981 | Jacobson et al. | 264/82 |
| 4,310,609 | 1/1982 | Liang et al. | 429/218 |
| 4,465,743 | 8/1984 | Skarstad et al. | 429/105 |
| 4,486,400 | 12/1984 | Riley | 423/592 |
| 4,830,939 | 5/1989 | Lee et al. | 429/192 |
| 4,952,467 | 8/1990 | Buchel et al. | 429/218 |
| 4,965,150 | 10/1990 | Dahn et al. | 429/218 |
| 5,013,620 | 5/1991 | Miyazaki et al. | 429/194 |
| 5,039,582 | 8/1991 | Pistoia | 429/218 |
| 5,336,572 | 8/1994 | Koksbang | 429/218 |
| 5,340,671 | 8/1994 | Koksbang | 429/218 |

Primary Examiner—Paul Lieberman
Assistant Examiner—M. Kopec

[57] ABSTRACT

A process of making lithium battery electrode active material having fine particles of vanadium oxide ($V_xO_y$) or lithium-vanadium oxide ($Li_zV_xO_y$) intimately mixed with fine particles of carbon. The process includes forming a wet solution of a vanadium oxide precursor and carbon, and then decomposing the precursor/carbon mixture at an elevated temperature or by atomization in a controlled atmosphere. Alternatively, fine particles of vanadium oxide are formed from precursor halogen compounds by atomization in oxygen.

22 Claims, 1 Drawing Sheet

LITHIUM BATTERY ELECTRODE COMPOSITIONS

This is a continuation of application Ser. No. 08/040,224 filed on Mar. 30, 1993 now abn.

FIELD OF THE INVENTION

This invention relates to electrochemical batteries and more particularly to improved positive electrode material for use with lithium-containing negative electrodes.

BACKGROUND OF THE INVENTION

The electronic conductivity of transition metal oxides, is generally lower than the electronic conductivity of transition metal sulphides. It is possible to make battery cathodes containing transition metal sulphide active material and a binder. However, it is necessary to add carbon to the composite cathode when the active material is based on an oxide. The requirement for carbon and the amount thereof depends, to some extent, on the specific oxide. The electronic conductivity of vanadium oxides decreases substantially (2–4 orders of magnitude) during lithium insertion upon discharge of a battery. This increases the need for even greater amounts of added carbon. The amount of carbon added is usually equivalent to about 40–50% by volume of the cathode mixture. This depends on the relative densities of the carbon and the other components in the cathode. Methods which allow reduction of the carbon content are important in order to increase the specific energies of the battery.

Current batteries contain high surface area oxide powders obtained by milling of precursor material. Current methods for the manufacture of powders involve mechanical grinding of precursor material prepared, for example, by rapid quench of molten material or by precipitation from an aqueous solution. As a result, the precursor material is in the form of lumps or large particles. By standard milling techniques it is difficult to reduce the lumps to less than 100 micrometers and very difficult to grind them to less than 10 to 50 micrometers. Smaller particle sizes are desirable because the larger the surface area, the higher is the current drawn from a battery while the current density on the surface of the active material remains low which allows high utilization of the active material.

SUMMARY OF THE INVENTION

According to one aspect of the invention, there is provided a method for preparing an electrode material comprising an oxide of vanadium (vanadium oxide) and carbon, in which a solution or wet mixture comprising a compound containing vanadium oxide is prepared with fine particles of carbon dispersed therein. The solution is then dried while maintaining dispersion of the carbon particles, and then is heated for a time and at a temperature sufficient to decompose the vanadium oxide (precursor) to one or more oxides of vanadium, but insufficient to ignite the fine particles of carbon. Carbon particles are formed from precursor materials (i.e acetylene) at temperatures of about 800° C. Thus, a suitable upper limit for the process of the invention is 800° C. However, lesser temperatures, as low as about 300° C., may be used. The decomposition may occur in minutes, depending on the temperature used. The product so formed has vanadium oxide particles intermingled with fine particles of carbon.

Suitable precursors of the vanadium oxides are compounds selected from the group consisting of $NH_4VO_3$, and vanadium oxide halogen compounds such as $VOF_2$, $VOBr$, $VOBr_2$, $VOBr_3$, $VOCl$, $VOCl_2$, $VOCl_3$ and similar compounds having the Br and Cl replaced by I or F. In the case of $NH_4VO_3$, the wet mixture is desirably aqueous; and the $NH_4VO_3$ (ammonium metavanadate) is the precursor of the $V_2O_5$ (vanadium pentoxide). The $V_2O_5$ intermingled with carbon is formed by preparing an aqueous solution comprising ammonium metavanadate and fine particles of carbon dispersed in the aqueous solution. The aqueous solution is dried while maintaining dispersion of the carbon particles and then the ammonium metavanadate is decomposed to form $V_2O_5$ intermingled with the carbon particles.

In a series of additional steps, the $V_2O_5$ intermingled with the fine carbon particles may be included in a second wet mixture comprising LiOH. A reaction is conducted so as to form $LiV_3O_8$ intermingled with the particles of carbon.

In the case of $VOF_2$, $VOBr$, $VOBr_2$, $VOCl$, the wet mixture is desirably non-aqueous. Vanadium oxide halogens such as $VOC_2$, $VOCl_3$ and $VOBr$ are liquid or very deliquescent and may be mixed with carbon with or without a non-aqueous solvent.

The decomposition of the vanadium oxide compound occurs in a range of about 200° C. to about 500° C. with various compounds having various decomposition temperatures. When decomposition is conducted in an environment which is essentially oxygen-free, the oxide of vanadium so formed is represented by the nominal formula $V_6O_{13}$. When the decomposition is performed in an oxygen-containing environment, the oxide of vanadium produced is represented by the nominal formula $V_2O_5$.

When decomposition occurs in an oxygen-containing environment, so as to cause formation of $V_2O_5$, additional steps can be added in order to form a lithium/vanadium oxide of the nominal formula $LiV_3O_8$ intermingled with the fine carbon particles, similar to the steps described with respect to the $NH_3VO_4$ precursor. The additional steps include forming a second wet mixture comprising $V_2O_5$ and lithium hydroxide and reacting the lithium hydroxide with the $V_2O_5$ to provide the $LiV_3O_8$ intermingled with fine particles of carbon.

Preferably, the reaction takes place at a temperature of at least about 20° C. It occurs more rapidly in a range of about 20° C. to about 60° C. It is desired that the LiOH be present in an amount sufficient to provide at least one mole of Li for each 1.5 moles of the $V_2O_5$.

In still another embodiment, fine particles of an oxide of vanadium are prepared by decomposition of a precursor by spray drying or atomizing. In this method, a liquid containing a vanadium oxide compound is atomized by contacting the liquid with a humidified gas stream at a temperature greater than the temperature of the liquid thereby providing very fine particles of an oxide of vanadium. Suitable vanadium oxides include vanadium oxide halogen compounds. Vanadium oxide halogen compounds which are suitable include: $VOCl$, $VOCl_2$, $VOCl_3$, $VOBr$, $VOBr_2$, $VOBr_3$ and $VOF_2$. These compounds are readily decomposed in humidified air to form vanadium oxides $V_xO_y$. Similar vanadium oxide halogen compounds having the $Br_x$ or $Cl_x$ replaced by $I_x$ or $F_x$ (x=1, 2 or 3) may also be used. Among these vanadium compounds, $VOCl_2$, $VOCl_3$ and $VOBr_3$ are in a liquid or very deliquescent state and optionally include a solvent. In the case of the others, the liquid to be atomized includes a carrier solvent, preferably a non-aqueous, organic solvent.

If desired, prior to atomization, the liquid containing the vanadium oxide compound may also include fine particles of carbon which are ejected into the atomized stream along with the vanadium oxide compound. This forms fine particles of vanadium oxide $V_xO_y$ intermingled with carbon particles.

It is an object of the invention to provide electrodes of improved specific energies by reducing vanadium oxide particle size and by improving contact between oxide particles and conductive carbon of the electrode. Other objects include reducing cost of production, reducing or eliminating milling, and increasing consistency and purity of the electrode active material.

These and other objects, features and advantages will become apparent from the following detailed description of the preferred embodiments, appended claims and accompanying drawings.

BRIEF DESCRIPTION OF THE DRAWING

The FIGURE is an illustration of a cross-section of a thin battery or cell embodying the invention.

DETAILED DESCRIPTION OF THE PREFERRED EMBODIMENTS

As shown in the drawing, a lithium electrochemical cell or battery 10 has a negative electrode side 12, a positive electrode side 14, and a separator 16 therebetween. In accordance with common usage, a battery may consist of one cell or multiple cells. The negative electrode is the anode during discharge, and the positive electrode is the cathode during discharge. The negative electrode side includes current collector 18, typically of nickel, iron, stainless steel, and/or copper foil, and a body of negative electrode active material 20. The negative electrode active material 20 is sometimes simply referred to as the negative electrode. The positive electrode side includes current collector 22, typically of aluminum, nickel, iron, stainless steel, and/or copper foil (such foils usually have a protective conducting coating), and a body of positive electrode active material 24 which has as its main component one or more oxides of vanadium. The positive electrode active material 24 is sometimes simply referred to as the positive electrode. The separator 16 is typically a solid electrolyte, or electrolyte separator. A suitable electrolyte separator (polymer electrolyte) is described in U.S. Pat. No. 4,830,939, incorporated herein by reference. The electrolyte separator is a solid organic polymer matrix containing an ionically conducting liquid with an alkali metal salt and the liquid is an aprotic polar solvent.

In one embodiment, positive electrode active material of vanadium oxide is intermingled with carbon and is prepared from an ammonium metavanadate precursor. The ammonium metavanadate ($NH_4VO_3$) may be prepared from alkali solutions of $V_2O_5$ and precipitation with ammonium chloride. The starting material, ammonium metavanadate, is dissolved in solution, preferably an aqueous solution. Ammonium metavanadate is soluble in 165 parts water, and its solubility increases with temperature. Ammonia enhances solubility in water.

Next, a desired amount of carbon is dispersed in the aqueous solution. The solution is dried and in the preferred method, water is removed by evaporation while the carbon is dispersed in the solution by stirring or by agitation of the reaction vessel.

The final step of the process consists of heating the dried mixture of carbon and ammonium metavanadate for a time and at a temperature sufficient to decompose the ammonium metavanadate to one or more oxides of vanadium, but at a temperature insufficient to ignite the fine particles of carbon. When the decomposition is conducted in an oxygen-containing environment, the vanadium oxide, produced by such decomposition, has the nominal formula $V_2O_5$ (vanadium pentoxide). When the decomposition step is conducted in an essentially oxygen-free environment, the vanadium oxide so produced is represented by the nominal formula $V_6O_{13}$. Preferably, the non-oxygen containing environment is an inert gas stream, such as argon or nitrogen, whereby the $NH_4VO_3$ is decomposed to $V_6O_{13}$. Thus, $V_2O_5$ and $V_6O_{13}$ are each formed from the decomposition product of $NH_4VO_3$ while being intermingled with carbon particles. The product is thus essentially in the form of carbon particles coated with the vanadium oxide or, depending on the relative sizes of the carbon particles and the vanadium oxide particles, the oxide particles may be coated with carbon. In any event, intimate mixing and intimate contact between carbon grains and oxide grains is achieved.

It is thought that the step of heating to decompose may be conducted at a temperature in the range of 400° C. to 450° C., or somewhat less because the carbon may act as a catalyst for the decomposition reaction. Thus, a temperature as low as about 300° C. may be selected. An advantage of the method is that the intimately mixed carbon and vanadium oxide is formed by heating in an atmosphere which contains $NH_3$ formed by decomposition of the ammonium metavanadate. This is thought to be beneficial because the reducing effect of $NH_3$ at 400° C. may remove sulfur and organic impurities present in the carbon particles. Suitable carbon particles are Ketjen Black or Shawinigan Black which are mixed with the starting $NH_4VO_3$ prior to evaporation of the solvent and decomposition of the $NH_4VO_3$, as stated above. Carbon particles are formed from precursor materials (i.e acetylene) at temperatures of about 800° C. Thus, a suitable upper limit for the process of the invention is 800° C. However, lesser temperatures, as low as about 300° C., may be used. The decomposition may occur in minutes, depending on the temperature used.

Preferably, the carbon particles are impregnated with an aqueous solution of the $NH_4VO_3$. Preferably, after dispersion of the carbon in the $NH_4VO_3$ solution, the excess solvent is removed by evaporation, filtering and/or vacuum drying. Elevated temperature may be used to speed the drying process.

Carbon particles may be obtained from Noury Chemical Corporation, under the designation Ketjen Black. The Ketjen Black particles, in an as-received condition, have a BET surface area of approximately 900 $m^2$/gram. Ketjen Black has an average particle size or equivalent average diameter in the range of about 10 to 100 nanometers (0.01 to 0.1 microns), and typically in the order of 30 nanometers. Thus, the carbon particles and oxide particles are very fine and of micron or submicron size.

The advantages of this procedure are that there is improved grain-to-grain contact between carbon and vanadium oxide particles ($V_2O_5$ or $V_6O_{13}$), and also between the various carbon particles, which enhances the electric contacts in the carbon and vanadium oxide network of the composite electrode. Another advantage is that the decomposition may occur in a temperature of about 300° C. or less, as compared to the 400° C. for decomposition of $NH_4VO_3$ in the absence of carbon. Thus, the process of the invention reduces energy requirements and preparation costs. Still, another advantage is that vanadium oxide particles are formed having an average size less than 100 microns, desirably less than 50 microns and, preferably, less than 10 microns. It should be noted that median particle size refers to that size at which 50% by weight of the particles are, respectively, above and below in size.

In another embodiment, the method of the invention can be used to prepare $LiV_3O_8$ in a completely amorphous state and in intimate contact with particles of carbon. The amorphous state is beneficial for rate capabilities and energy density. This composite is prepared by forming a $V_2O_5$/carbon mixture, as described above. This $V_2O_5$/carbon composition is then dispersed in a solution of LiOH in water, where the amount of $V_2O_5$ and LiOH corresponds to the stoichiometric amounts of the two compounds needed for formation of $LiV_3O_8$. It is thought that part of the $V_2O_5$ dissolves in solution, followed by reaction between the dissolved $V_2O_5$, LiOH and water and then with the remaining solid $V_2O_5$, with the subsequent formation of $LiV_3O_8$. The reaction is fairly slow at room temperature, but proceeds at a reasonable rate at a 50° C. to 60° C. A process of adding progressive amounts of vanadium pentoxide to an LiOH solution is more fully described in U.S. Pat. No. 5,039,582, which is incorporated herein in its entirety by reference. The reaction to form $LiV_3O_8$ is conducted while keeping the carbon and undissolved $V_2O_5$ dispersed in solution, so that the contact between the product $LiV_3O_8$ and the carbon is optimized. Advantageously, because part of the $V_2O_5$ is dissolved during the procedure, intimate mixing between the $V_2O_5$ precursor from which the $LiV_3O_8$ is formed and the carbon, is essentially automatically achieved. Particle size of the lithium vanadium oxide is on the order of that described earlier in connection with $V_2O_5$ and $V_6O_{13}$.

In still another embodiment, other vanadium oxide compounds are decomposed to form binary vanadium oxides $V_xO_y$ intermingled with fine carbon particles. Suitable vanadium oxide compounds include vanadium oxide halogens such as VOBr, $VOBr_2$, VOCl and $VOF_2$ which are all thought to decompose below 200° C. except VOBr which decomposes at a temperature of about 480° C. Others are $VOCl_2$, $VOCl_3$ and $VOBr_2$ which are liquids and, therefore, easy to mix with carbon or absorb carbon. The family of vanadium oxide halogens which are useful in the process are represented by the general formula V, O, $M_x$ where x= 1, 2 or 3.

In the basic method, the vanadium oxide halogen compound is mixed with particles of carbon, forming a wet mixture. The solvent is then dried while maintaining dispersion of the carbon particles, and then is heated for a time and at a temperature sufficient to decompose the vanadium oxide compound to one or more oxides of vanadium, but insufficient to ignite the fine particles of carbon. The product so formed comprises particles of one or more oxides of vanadium intermingled with fine particles of carbon. Given the presence of carbon, which acts as a catalyst, reduction of the stated decomposition temperatures is possible. It should be noted that at lower decomposition temperatures, some compounds may become less stable and may react with water and, therefore, require handling under inert gas conditions, or with a non-aqueous solvent.

In still another embodiment, finely dispersed powders of binary vanadium oxides are formed from vanadium oxide halogens ($V_xO_yM_z$, M=Cl, Br, F or I) by decomposition in a moist atmosphere by atomization. Such compounds are exemplified by the general formula $V_1O_1M_x$ where x=1, 2 or 3. Among the vanadium oxide halogen compounds, $VOCl_2$, $VOCl_3$ and $VOBr_3$ are particularly suitable because they are liquids and a carrier solvent (dispersant) may not be required for atomization or spray drying. Other vanadium oxide halogen compounds such as VOBr, $VOBr_2$, VOCl and $VOF_2$, are not typically in a liquid condition, these compounds may be dissolved or dispersed in a non-aqueous solvent and then atomized to achieve finely dispersed binary $V_xO_y$ powders. When the decomposition takes place in open air, the major component of such decomposition will be $V_2O_5$. However, by adjusting the reducing properties of the atmosphere, various vanadium oxides in the form of fine particles may be obtained. Such particles are of micron or submicron size. In the absence of carbon the finely dispersed vanadium oxide powders so produced are then mixed with carbon without the necessity of ball-milling to achieve intimate contact. Alternatively, fine particles of carbon may be included in the liquid prior to atomizing. The conditions for atomization are rather broad and include forming droplets in a gas stream containing water, i.e. humidified gas stream. The conditions for decomposition of an atomized stream of VO halogen compounds ($V_xO_yM_z$) are rather broad. From a practical view point, there must be sufficient humidity to permit reaction between $V_xO_yM_z$ molecules and droplets or molecules of water. Thus, even a small amount of water in an air stream will yield some binary oxide product. As the air is made more humid, the dispersion and diffusion of water molecules result in improved contact with $V_xO_yM_z$ molecules, and a greater yield of binary $V_xO_y$ product. The temperature of such process must be sufficient to prevent recondensation of water and consequential reduction of water in the humid air. It is possible to conduct the atomization/decomposition at about room temperature, i.e. about 10° C. to about 40° C., and then adjust the flow of atomized $V_xO_yM_z$ and humid air to achieve a desired yield. The theoretical upper temperature limit is that at which decomposition of the desired binary oxide product, or carbon particles intermingled therewith, occurs. This is thought to be on the order of about 800° C.

The vanadium oxides of the invention were used to prepare cells with lithium-based anodes. Several cells were prepared by mixing oxide active material carbon (typical Shawinigan Black) and electrolyte/binder. The oxides were prepared with and without carbon. Thus, in some cases, carbon particles were added after fine particles of the oxide had been formed. A typical composition is as given in Table 1.

TABLE 1

| Typical Cathode Composition | Percent by Weight |
| --- | --- |
| Vanadium Oxide | 45.2% |
| Carbon | 10.3% |
| Propylene Carbonate (PC) | 33.3% |
| PolyEthylene Oxide (PEO) | 1.0% |
| PolyEthyleneGlycolDiAcrylate (PEGDA) | 8.8% |
| TriMethylPolyEthylene Oxide TriAcrylate (TMPEOTA) | 1.5% |

The cathode was coated onto nickel foil followed by electron beam curing (cross-linking/polymerization) of the acrylate component. Then the electrolyte was coated on top of the cathode and cured with ultraviolet light. The lithium electrode was applied on top of the electrolyte separator and the battery was finally placed in a flexible pouch which was heat sealed under vacuum.

The energy density of the batteries based on these new electrode materials is improved. That is believed to be achieved by decreasing the carbon content of the cathode, providing better contact between the carbon and the vanadium oxide, and keeping the carbon content at a lesser level than would otherwise be required due to the increased contact which increases the electronic conductivity allowing higher current drains, while the energy density remains essentially unchanged. Particle size is on the order of less than 100 microns, desirably less than 50 microns and, preferably, less than 10 microns.

The method of the invention eliminates, or at least reduces, the need for standard milling techniques, whereby it is difficult to reduce particle size to less than about 100 microns. Since suitable particle size, less than 50 microns and, preferably, less than 10 microns is achieved by intimate mixing with carbon to form an electronically conducting carbon network with good contact to the active material on a microscopic scale, the invention avoids heavy-duty milling methods. However, if desired, milling of the final product is possible and desired for mixing of carbon with oxide particles if such carbon was not previously included. The degree of any milling is greatly reduced. That is, the mixing force of any subsequent milling step would be very much be reduced.

While this invention has been described in terms of certain embodiments thereof, it is not intended that it be limited to the above description, but rather only to the extent set forth in the following claims.

The embodiments of the invention in which an exclusive property or privilege is claimed are defined in the appended claims.

I claim:

1. A method of preparing a composition for an electrode comprising forming a wet mixture consisting essentially of ammonium metavanadate ($NH_4VO_3$) and fine particles of carbon dispersed in a solvent, removing at least a portion of the solvent and decomposing the ammonium metavanadate in an oxygen-containing environment at a temperature sufficient to form particles of an oxide of vanadium represented by the nominal general formula $V_2O_5$ intermingled with and in grain-to-grain contact with the fine carbon particles.

2. The method according to claim 1, wherein the decomposition temperature is in a range of about 300° C. to about 450° C.

3. The method according to claim 1, wherein said at least portion of the solvent is removed from the mixture by filtration or vacuum sensation.

4. The method according to claim 1, wherein said at least a portion of the solvent is removed by heating to a temperature less than the decomposition temperature.

5. The method according to claim 1 and further comprising after said decomposition;

forming a second wet mixture comprising the decomposition product and lithium hydroxide (LiOH), and reacting the LiOH with the decomposition product for a time and at a second temperature sufficient to provide lithium-vanadium oxide of the nominal formula $LiV_3O_8$ intermingled with and in grain-to-grain contact with the fine carbon particles.

6. The method according to claim 5, wherein the second temperature is at least about 20° C.

7. The method according to claim 5, wherein the second temperature is in a range of about 20° C. to about 60° C.

8. The method according to claim 5, wherein the LiOH is present in an amount sufficient to provide at least one mole of Li for each 1.5 moles of the $V_2O_5$.

9. A method of preparing a composition for an electrode, comprising:

a) forming a mixture comprising a vanadium oxide halogen compound and fine particles of carbon dispersed in the mixture; and b) decomposing the vanadium oxide halogen compound to form particles of one or more oxides of vanadium, and intermingling the particles of the one or more oxides of vanadium with the fine carbon particles in grain-to-grain contact therewith.

10. The method according to claim 9, wherein the mixture of step (a) includes a solvent and before step (b) at least a portion of the solvent is removed from the mixture.

11. The method according to claim 9, wherein the vanadium oxide halogen compound is selected from the group consisting of $VOF_2$, $VOBr$, $VOBr_2$, $VOBr_3$, $VOCl$, $VOCl_2$ and $VOCl_3$.

12. The method according to claim 9, wherein the temperature is in a range of about 200° C. to about 500° C.

13. The method according to claim 9, wherein step (b) is conducted in an environment which is essentially oxygen-free, thereby providing the oxide of vanadium represented by the nominal formula $V_6O_{13}$.

14. The method according to claim 9, wherein step (b) is conducted in an oxygen-containing environment thereby providing the oxide of vanadium represented by the nominal formula $V_2O_5$.

15. The method according to claim 14 and further comprising;

forming a second mixture comprising the product of step (b) and lithium hydroxide (LiOH), and reacting such mixture of LiOH and said product of step (c) for a time and at a second temperature sufficient to provide lithium-vanadium oxide of the nominal formula $LiV_3O_8$ intermingled with the fine carbon particles.

16. The method according to claim 15, wherein the second temperature is at least about 20° C.

17. The method according to claim 15, wherein the second temperature is in a range of about 20° C. to about 60° C.

18. The method according to claim 15, wherein the LiOH is present in an amount sufficient to provide at least one mole of Li for each 1.5 moles of the $V_2O_5$.

19. The method according to claim 1 wherein the solvent removal and the decomposition are each conducted at an elevated temperature, and the solvent removal temperature is less than the decomposition temperature.

20. The method according to claim 9 wherein the mixture of step (a) includes a solvent, before step (b) at least a portion of the solvent is removed from the mixture, the solvent removal and the decomposition are each conducted at an elevated temperature, and the solvent removal temperature is less than the decomposition temperature.

21. A method of preparing a composition for an electrode, comprising:

a) forming a mixture consisting essentially of ammonium metavanadate ($NH_4VO_3$) and fine particles of carbon dispersed in a solvent;

b) drying the mixture at a first temperature while maintaining dispersion of the carbon particles; and c) heating the product of step (b) for a time and at a second temperature greater than the first temperature and sufficient to decompose the ammonium metavanadate in an oxygen-containing environment to form particles of one or more oxides of vanadium and insufficient to ignite the fine particles of carbon, and intermingling the particles of the one or more oxides of vanadium with the fine carbon particles in grain-to-grain contact therewith.

22. The method according to claim 21 and further comprising after step (c);

forming a second wet mixture comprising the product of step (c) and lithium hydroxide (LiOH), and reacting the LiOH with the product of step (c) for a time and at a third temperature less than the second temperature and sufficient to provide lithium-vanadium oxide of the nominal formula $LiV_3O_8$ intermingled with and in grain-to-grain contact with the fine carbon particles.

* * * * *